INVENTORS
ROGER H. DOGGETT
LAURENCE R. B. HERVEY
CHARLES E. LANYON

By *Attorney*

Jan. 30, 1962  R. H. DOGGETT ET AL  3,019,138
MUCILAGE-PRODUCING MATERIAL
Filed July 15, 1959
2 Sheets-Sheet 2

INVENTORS
ROGER H. DOGGETT
LAURENCE R. B. HERVEY
CHARLES E. LANYON
By
Attorney 3,019,138
MUCILAGE-PRODUCING MATERIAL
Roger H. Doggett, Natick, and Laurence R. B. Hervey, West Concord, Mass., and Charles E. Lanyon, Troy, N.Y., assignors, by direct and mesne assignments, to John A. Manning Paper Company, Inc., Troy, N.Y., a corporation of New York
Filed July 15, 1959, Ser. No. 827,233
3 Claims. (Cl. 127—29)

This invention relates to an extraction process and to a novel material resulting from this process.

It has been known for some time that certain plants contain a mucilaginous material which possesses useful properties; but standard drying techniques are not applicable to the production of a stable dried material from such plants having these properties. An outstanding example of such a mucilage-bearing plant is the domestically grown okra, the pods of which contain large amounts of mucilage-producing material.

It is known that the addition to aqueous liquids of certain materials, among which is the mucilaginous material of okra pods, causes these aqueous liquids to assume a ropy-like character which can best be compared to the behavior associated with uncooked egg whites. Thus, the liquid which has been made ropy tends to flow in large associated masses rather than in the even, steady stream. The additives which impart ropy characteristics to a liquid may be used in a wide variety of applications such as a thickener or bodying agent in foods, as a possible medicinal agent, as a lubricant in such compositions as hand lotions, as a cleaner, a carrier of active material, or as a deflocculant or as a flocculant.

Many additive materials which are capable of acting in one or more of the typical capacities cited above are known. Among such additives is gum karaya which is a gummy exudation produced by Asiatic trees or shrubs (Sterculia urens and associated species). Because gum karaya must be imported and then further processed, it means that it is a relatively expensive additive. Furthermore, the supply of gum karaya is susceptible to being cut off, particularly in time of hostilities. Moreover, certain lots of gum karaya from India have been rejected for sanitary reasons, or have been permitted to enter the country only after certification that the product was not to be used in a food application. It may therefore readily be seen that it is desirable to have an inexpensive domestic source of a material which is capable of imparting ropy characteristics to a liquid and which may be used without restriction in food products.

In addition to the gum karaya, the mucilaginous materials from plants, such as marsh mallow, hollyhock, okra, rose mallow, hibiscus, and the like have been used as deflocculants in paper making (see for example, F. D. Broadbent, "The Deflocculation of Long-fibered Pulp Suspensions by Mucilages," Supplement to the World's Paper Trade Review No. 49, June 27, 1941). The accepted way of preparing the necessary extracts from these mucilage-bearing plants has been to grind the plant to a pulp, put it in a finely woven cloth, immerse in cold water and after soaking express the mucilaginous material through the cloth. The water dispersion or solution of the mucilage must then be used immediately. No way has been known for making a stable dried product from these plants which would be suitable as a deflocculant, for example. This has meant that their use has required either shipping the entire plant to the point of use or setting up paper-making equipment at the source of supply of the mucilaginous-bearing plants. It may be shown, for example, that in order to use the extracts of these plants as deflocculants, it would be necessary to ship about one to one and one-half pounds of plants to make one pound of paper. Moreover, the use of the mucilaginous-bearing plants has heretofore been limited to the season at which they were ripe. This need for using these mucilage-bearing plants almost directly after harvesting, the need for keeping them fresh until they can be used, and the further necessity for water-extraction of the mucilaginous material just prior to use, have considerably hindered the acceptance of these materials as deflocculants and for like uses.

Known drying techniques such as heating, air-drying and the like are not applicable to producing a stable, dry, mucilage-producing material from these plants and in particular from okra pods. Moreover an organic dehydrating and precipitating liquid employed in known drying techniques is not effective. That is, grinding the okra pods and exposing them to a dehydrating and precipitating liquid for an extended period of time will not result in a final product which is permanently stable and which is capable of imparting maximum ropiness to aqueous liquids.

In view of the many uses a vegetable mucilage has, it would be desirable to have a process by which the mucilage-producing portion of certain plants, e.g., okra pods, may be extracted to give a product which possesses a maximum mucilage-producing property and which at the same time is so stable that it may be stored over long periods of time without any material loss in its effectiveness.

It is therefore an object of this invention to provide a method for processing mucilage-bearing plants to produce a new and novel material which is mucilage-producing in nature. It is still a further object to provide such a method which enables such plants, and particularly okra pods, to be processed in a minimum amount of time and hence to impart maximum stability to the product resulting from the treatment of the plants. It is another object of this invention to provide a dry, stable material derived from okra pods which may be added to aqueous liquids to make them ropy in nature or to impart to them certain desired physical characteristics. It is another object to provide a material which may be characterized as a stable product possessing maximum mucilage-producing effectiveness. These and other objects will become apparent in the following detailed description.

In order to achieve the objects of this invention, it is necessary to process the mucilage-bearing plants in a way to produce an undegraded product which is a dry material capable of producing ropiness in water. This dry product will be referred to generally as a mucilage-producing material. Degradation of a mucilage-producing material derived from plants can apparently be brought about by enzymatic action, heat, and possibly molecular breakdown in grinding. The process of this invention essentially eliminates these factors to give an undegraded material.

Of all of the mucilaginous-bearing plants known (some of which are listed above) one of the most common is the domestic okra. Okra possesses the advantages of being easily grown domestically, abundant, and cheap. The following description of this invention will be presented in terms of producing a stable, mucilage-producing material derived from okra. This will be referred to as "okra product." However, the process of this invention is not to be construed as being limited to okra, but rather it is to be noted that the process is applicable to all plants which are mucilage-bearing and an example is given to show how the process is applicable to extracting the mucilage-producing material from hibiscus roots.

Introducing crushed or chopped okra pods into water is known to give rise to a very ropy aqueous dispersion. The use of fresh okra pods to thicken a liquid or increase its ropiness may be possible in some applications, but is not practical since, for obvious reasons, it would be undesirable to add chopped okra pods to such food products as ice creams, or to such items of commerce as hand lotions and window cleaners, or in such industrial processes as paper making. In addition, the use of fresh green pods may well be impractical because of the weight and volume involved since fresh okra pods are about 90% water.

Merely to dry the pods by such means as hot-air drying in an oven or like apparatus is not workable since under such usual drying conditions at temperatures high enough to make the drying process rapid and practical, the mucilage contained in the okra pod deteriorates and its effectiveness in imparting ropy qualities to a liquid is greatly reduce or even destroyed. On the other hand, if a drying process using low heat or none at all is used, it is so slow as to permit enzymatic action to set in and this also effectively destroys the mucilage-producing properties of the material. We have found, however, that by processing okra in accordance with the teaching of this invention we can provide a dry, easily handled, and easily stored okra product capable of achieving all of the above objects of this invention.

The process of this invention comprises the steps of macerating a mucilage-bearing plant and subjecting the resulting macerated material to a plurality of extractions in a dehydrating liquid inert to the mucilage content of the material, each extraction comprising the steps of compressing the material, introducing the material while in a compressed state into a dehydrating liquid whereby said material expands rapidly to imbibe said liquid, and removing the resulting dehydrating liquid from the material. The resulting product may then be dried and ground under properly controlled conditions to give a powder which is easily handled and which will remain stable over extended storage periods. It should be noted that producing a stable product is not merely a matter of macerating the mucilage-bearing plant in the presence of an extraction liquid, washing and air-drying it. Such a process has been previously disclosed in connection with preparing an okra product for analysis (see for example J.A.C.S. 76, 1673, 1674 (1954). We have found that the procedure disclosed in that reference does not produce a stable product or product having the properties desired. Moreover this reference procedure dehydrates the material very slowly thus permitting enzymatic action to take place and making it to prolonged a process to be practical. If the expedient of chopping the raw material to a fine state is employed to hasten such a process, then the final mucilage-producing material is less stable and less effective.

The process of this invention will now be described in detail and with reference to the accompanying drawings in which.

Figure 1:
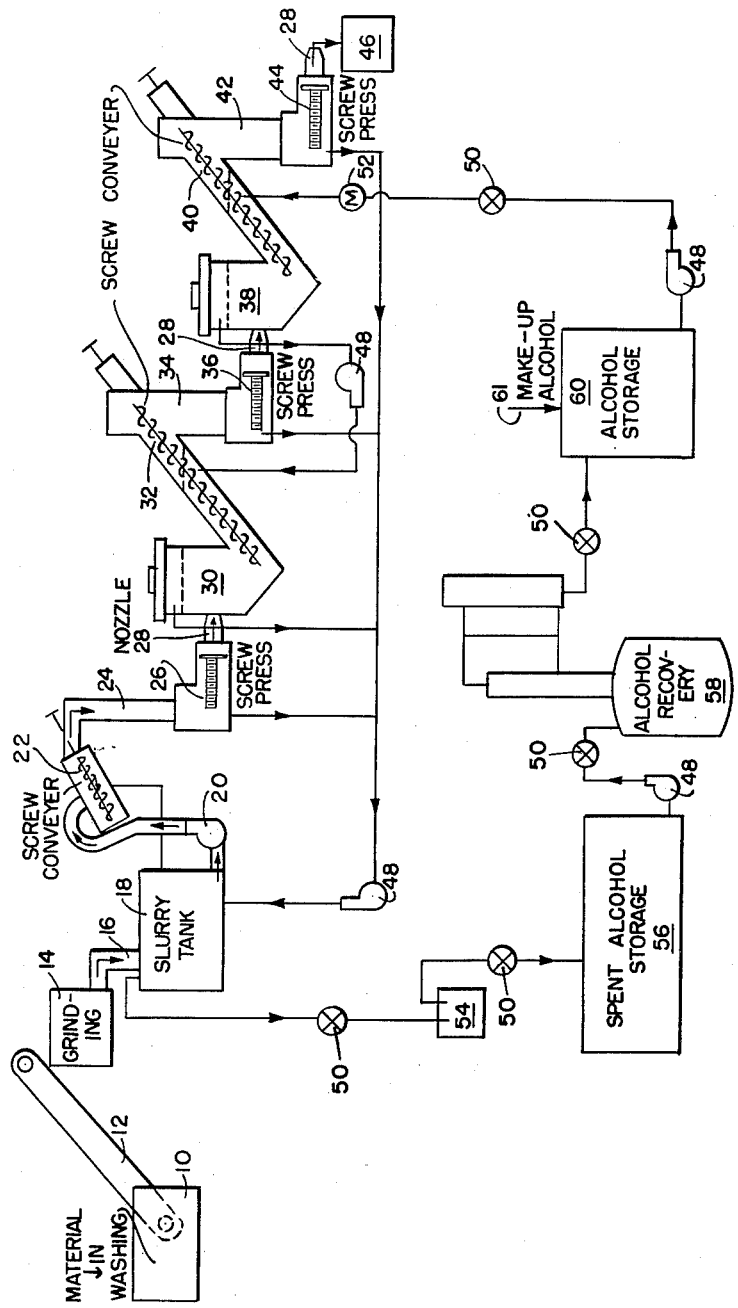
FIG. 1 is a schematic drawing illustrating the process of this invention.

The following detailed description of the process and product of this invention is given using okra pods as an example of a well-known mucilage-bearing plant. However, this is done for convenience of presenting the description and it is not intended to limit this invention to okra pods. Example II shows that the process is equally applicable to other mucilage-bearing plants.

The okra pods as they are picked contain about 90% water by weight. This natural water is so contained in the okra pods that when they are chopped, ground, or otherwise macerated or reduced in size, they form a gelatinous or gummy mass, making it exceedingly difficult to remove the water from the macerated material by any easy, rapid method. Moreover, if sufficient heat is applied for a sufficient length of time to this gelatinous mass, the effectiveness of the resulting product as a thickener, lubricant, deflocculant, etc., is materially decreased or even completely destroyed. The destruction of desirable properties appears to be related to the time-temperature factor, and once the pods are macerated or cut they must be treated immediately. It is necessary to remove the water and other undesirable materials (as discussed below) from the okra pods at room temperature or at relatively low heat while keeping the time required close to a minimum.

The gelatinous gummy mass of chopped or ground okra pods can be dehydrated at essentially room temperature in a minimum amount of time and subsequently dried if the gelatinous mass is first transformed into a relatively free-flowing mass from which water can be removed. Such transformation is accomplished in the process of this invention by precipitating the mucilaginous material of the okra pods in an organic extraction liquid which is miscible with water in substantially all proportions but which is inert to or a non-solvent for the mucilaginous material. The extraction must take place as rapidly as possible to produce a final mucilage-producing material which is stable and undegraded. In order to do this the ground okra pods are exposed to a series of extractions, each extraction of which consists of compressing the ground material and expanding it rapidly in the extraction liquid. By expanding the compressed material in the presence of the extraction liquid the material very rapidly imbibes the extraction liquid and hastens the precipitation and dehydration of the mucilage-producing material. If the compressed material is expanded in air and then introduced into the extraction liquid the dehydration is not as effective as expanding in or under the liquid and the final product is less stable.

The process of this invention has been found to give a final product which is more effective with respect to its ability to impart ropiness to aqueous liquids and also with respect to its stability than any other drying process known. The nature of the okra pods being treated is such that they lend themselves well to this novel type of extraction. That is, the okra pods contain a sufficient cellulosic or fibrous structure to cause rapid expansion of the compressed material once it is introduced into the dehydrating liquid.

Each of the steps of the process of this invention will be discussed below in detail. Briefly the steps include grinding (or otherwise macerating the okra pods), passing the macerated material through apparatus which successively compresses and then permits it to expand under the dehydrating liquid, and finally drying to remove residual extraction liquid. The dried powder may then be ground, if desired, at any future time.

Reducing the okra pods to a suitable particle size should be accomplished as soon after the pods are picked as possible, and this step should be carried out at as low a temperature as possible, preferably not above room temperatures. However, as dehydration progresses, the working temperatures may be somewhat increased as indicated below. If the okra has been frozen to keep it until processing, it may be partially thawed before reducing it to size for the extraction process, or it may be macerated in a frozen state.

Reducing the pods to the desired particle size may be done by any known techniques, such as by passing the pods through a meat chopper or grinder. The degree of grinding, i.e., the size of the particles obtained in the grinding, may vary from that size which will pass through a screen with one-eighth inch holes to one having one-half inch holes. If any large amount of the particles are reduced to sizes below that specified, the dried product does not store well. If too many particles are larger than that specified as the upper size range, the length of time the macerated material must be exposed to the extraction liquid will have to be increased.

In the practice of this invention the larger size particles (i.e., those which will just pass a screen having one-half inch holes) are preferred. It is, in fact, by the process of this invention that it is possible to process okra pods ground no finer than this. Extraction methods which depend upon the exposure for a prolonged period of time of such sized particles to an extraction liquid, without the compression and expansion of the material under the liquid, cannot produce a stable, effective dried product. This is due to the fact that the dehydration is not accomplished before degradation sets in and that true diffusion is apparently never fully realized. The process of this invention, on the other hand, aids in removing materials which are detrimental to the storage life of the product.

On the other hand, if better and more rapid diffusion is sought by grinding okra pods to sizes finer than that which will just pass a sieve with one-eighth inch holes, the resulting dried product will be degraded for there appears to be a surface effect connected with the finally dried material. That is, the greater the surface area, the less stable is the dried product and since the size of the dried particles is directly related to the size of the originally ground particles there is established a relationship between the degree of original maceration and the final stability of the mucilage-producing material.

It may be seen that in order to make a stable, undegraded mucilage-producing product it is necessary to be able to dehydrate relatively large particles very rapidly. The process of this invention provides a method for accomplishing this and thereby provides a stable mucilage-producing material from plants.

Figure 2:
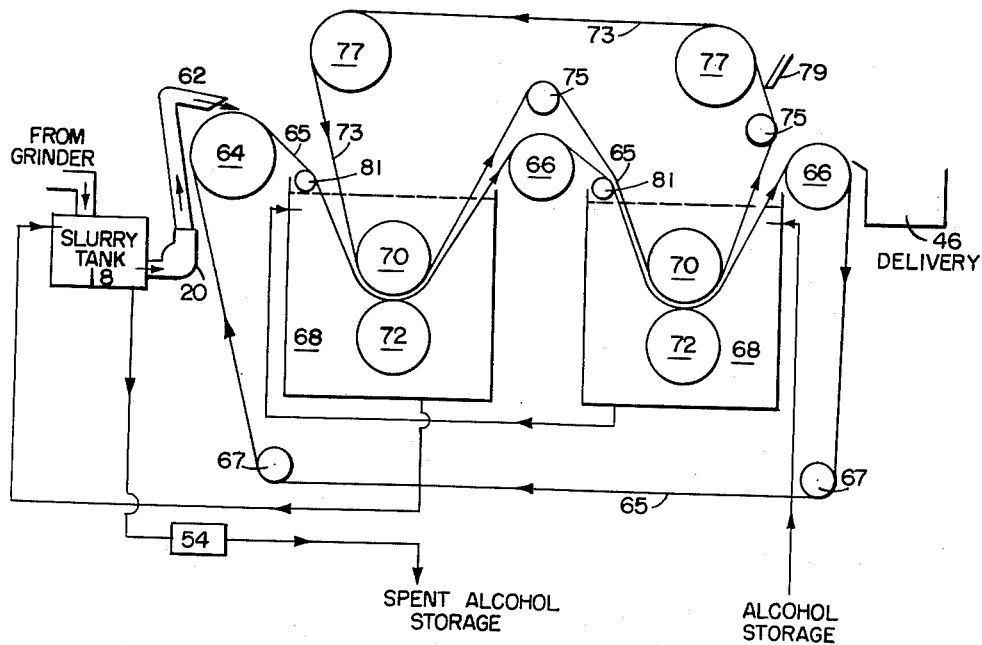
FIG. 2 is a modification of FIG. 1 illustrating, in a schematic way, another type of apparatus which may be employed.

The process of this invention is diagrammatically represented in FIG. 1 which illustrates one type of apparatus which may be used to carry out the process. FIG. 2 illustrates a modification of the apparatus of FIG. 1.

In FIG. 1 okra pods are fed into a washer 10 which may conveniently comprise apparatus capable of gently agitating the okra pods in water until any dirt, sand or other material is removed from the exterior of the pods. From the washer 10 the okra pods are then transported, such as by a moving conveyor belt 12 to a grinder 14 in which the okra pods are reduced to the size desired before dehydration. Other apparatus capable of achieving the desired degree of maceration may, of course, be substituted for the grinder of FIG. 1.

From the grinder 14 the macerated okra is transferred by conduit 16 to a slurry tank 18 which contains dilute alcohol drained from the extraction steps. In the example embodied in FIG. 1, isopropyl alcohol is used as an extraction liquid and will be referred to as alcohol. The okra mass from the slurry tank 18 is then transported by suitable means, such as pump 20, into a feed-screw device 22 which conveys the alcohol-okra mass by suitable conduit 24 to a first screw press 26. There the okra is compressed and the residual alcohol removed by suitable conduit lines leading from press 26 as discussed below. The okra mass leaves the first screw press 26 in a compressed state through nozzle 28 and is delivered in that state under the level of the extraction liquid in a first extraction vessel 30. The compressed okra as it enters extraction vessel 30 expands very rapidly, imbibing the extraction liquid contained therein.

As the okra settles, it is picked up and conveyed by means of a screw conveyor 32 and conducted by way of a tower 34 to a second screw press 36. The okra is again compressed and the dehydrating liquid drained off and again forced in a compressed state under the level of the extraction liquid in a second extraction vessel 38. As before, the compressed okra expands rapidly and imbibes the extraction liquid. This material is then moved by means of a screw conveyor 40 through tower 42 to be compressed in a third screw press 44 from which the compressed material, containing about 60% solid material and 40% liquid, is removed to a delivery station 46.

The material delivered at station 46 has a very high solids content while containing only a small amount of water. Thus, for example, the okra product at this point may contain as much as 70 to 75% solids, the remainder being essentially all alcohol, i.e., not more than about 15% by weight water, based upon the total weight of okra product delivered. Reduction of the water content to at least about 25% by weight is important to the production of a final okra product having properties desired.

FIG. 1 also illustrates how the dehydrating liquid, isopropyl alcohol for example, is preferably circulated countercurrently in the process. In the flow system shown in FIG. 1 it will be seen that the fresh alcohol is introduced to contact the okra during the last extraction step while the nearly spent alcohol is used in the slurry tank. Alcohol entering the slurry tank 18 is usually about 50% by weight alcohol or a few percent higher.

Suitable lines are provided for cycling the alcohol and it will be seen in FIG. 1 how extraction liquid is circulated in the direction of flow indicated by the arrows. Suitable pumps 48, valves 50 and a metering device 52 are provided in the system.

The spent alcohol is drawn off through a screen (not shown) from the top of the slurry tank 18, the level of which is controlled by a level control apparatus 54. This spent alcohol is stored in a vessel 56 and is recovered in a suitable distillation device 58. The recovered alcohol is then in turn stored in a storage vessel 60 and from this vessel it is pumped into the last screw conveyor 40 and extraction vessel 38. Make-up alcohol is introduced by way of the line 61 as indicated.

FIG. 2 illustrates another type of apparatus suitable for the process of this invention. The okra pods are macerated and delivered to a slurry tank 18 as in the apparatus of FIG. 1. Then by means of pump 20, the okra-alcohol mixture from the slurry tank 18 is delivered through conduit 62 onto an endless foraminous conveyor belt 65 which carries the macerated okra pods through the succeeding extraction steps. Suitable foraminous guide rolls 64 and 66 having means, not shown, for draining off the extraction liquid are provided. Auxiliary guide rolls 67 and 81 are also provided. Compression of the okra material is achieved by passing it, on belt 65, between a plurality of pairs of pressure rollers 70 and 72 located in tanks 68 containing the extraction liquid. Expansion of the compressed material takes place as the belt passes beyond the contact point of rolls 70 and 72 and the material is exposed to the extraction liquid.

In order to maintain the okra material being treated in proper position on belt 65 an auxiliary belt 73 is provided to rotate directly above belt 65. Suitable guide rolls 75 and 77 are provided and means 79 is also provided to remove any of the okra material which may adhere to belt 73.

The manner in which the extraction liquid is used, its supply and recovery are essentially the same as in the apparatus of FIG. 1. For this reason, the apparatus for these operations of the FIG. 2 modification of the process are not repeated.

In practicing this invention the compression of the okra before expansion under the extraction liquid should be carried out to the point where an appreciable amount of the liquid is removed from the okra to form a compact mass which expands rapidly when introduced into the extraction liquid. With each succeeding compression step it is possible to achieve a greater degree of compression so that the material leaving the last screw press (for example 44 in FIG. 1) is a moist, crumbly product, e.g., up to about 75% solids.

The temperature at which the mucilage-producing material is extracted may be increased at each succeeding compression step as the material is further dehydrated, but it is preferable to maintain temperatures at relatively low levels. For example, it is preferred that grinding and the first compression step be carried out at near ambient temperatures (e.g., 80–85° F.) while the last compression step should not be carried out at above about 150° F., and preferably not above about 125° F. Higher extraction temperatures during the last extraction steps may be desirable to remove traces of coloring matter or the like.

The liquid suitable for precipitating and dehydrating the mucilage-producing material from mucilage-bearing plants may be defined as an organic dehydrating liquid which is miscible with water in essentially all proportions and which is immiscible with and inert to the mucilage-producing material of the okra pods. Such organic extraction liquids include but are not necessarily limited to such known organic dehydrating agents as the lower aliphatic alcohols such as methyl alcohol, ethyl alcohol, isopropyl alcohol, tertiary butyl alcohol; ketones such as acetone and methyl ethyl ketone; and ethers such as dioxane.

If the finally prepared mucilage-producing material is destined for industrial uses, it may be considered more economical in the process to use only one organic extraction liquid. But where the final material is to be used as a food additive it may be desirable to wash the precipitated dehydrated material with one or more additional organic agents or suitable wash liquids to achieve such additional effects as decolorization. Such washing would preferably be performed after the last extraction step. Thus, for example, the mucilage-producing material which has been precipitated and dehydrated in ethyl or isopropyl alcohol may be washed with acetone to further decolorize it.

Since it has been found essential to the process of this invention to accomplish the precipitation and dehydration of the mucilage-bearing raw material as rapidly as possible, the macerated okra is continually being moved through the system such as shown in FIG. 1 at a rate so that any one batch of okra pods is processed in a period of from 20 to 30 minutes. The process may be somewhat slower than that indicated but this is not desirable. If the processing is much faster than this time, there is some chance that such results as the inactivation or destruction of enzymes, or the removal of the alcohol-soluble materials will not be completely accomplished.

The very short time required for extraction by the process of this invention is in sharp contrast with that required for the process which achieves dehydration by permitting the raw material to stand in the liquid and dehydration to be accomplished by natural diffusion. For in the latter type of extraction, the macerated material must remain for from about two to four hours in each successive extraction liquid. By the process of this invention what may be called a mechanical or forced diffusion is used, thus making it possible to materially reduce processing time and increase the stability of the final mucilage-producing material.

Other factors which enter into the production of a stable undegraded product include the rapidity with which the okra pods are processed once they are picked and maturity of the okra pods themselves. These factors will be discussed in detail below.

Once the mucilage-producing material has passed through the last extraction step and delivered to delivery station 46 (FIGS. 1 and 2) as a damp, crumbly product, it may be further washed as noted above and then dried, or it may be dried directly by any standard means. The usual precautions should be exercised with respect to possible contaminants or contaminating atmospheres. Thus, drying may be done in an oven, under infrared radiation, or air drying. Drying is preferably accomplished by spreading the alcohol-damp material in a thin layer and passing warm air over it. To obtain an undegraded product, drying temperatures should not rise above 125° F. Because the water content of the material is relatively low, final drying can be accomplished rapidly and at relatively low temperatures.

The dry product can be described as readily friable aggregates, the aggregates consisting of dry, potentially mucilaginous material bound to the alcohol-insoluble cellulosic material in random fashion to form a free-flowing, divided material, this material being reducible to an active, stable, flour-like powder having an apparent density of between about 0.1 and 0.5 gm./cc. when ground at temperatures below about 125° F. to a particle size ranging between about 45 and 75 microns, the product being further characterized by being essentially free from any active enzymatic systems and from alcohol-soluble materials and by its ability to quickly disperse in aqueous liquids by simple stirring to impart a stable, ropy-like character to the liquid.

After the okra product has been thoroughly dried, it may be ground to the desired particle size. Final grinding is preferably done just prior to use. However, it may be accomplished as part of the overall process if the finely ground material is kept under relatively moisture-free, light-free conditions.

In grinding there are two critical factors, the extent to which particles are reduced in size and the temperature at which the grinding is accomplished.

The optimum particle size is influenced by several factors. If particles are allowed to remain too large, the surface area is materially reduced and the resulting swelling of the okra product in water is slow. In the case of paper making the particles should be capable of passing at least a 200-mesh screen in order that the okra particles are not visible in the final paper formed. On the other hand, if the particles are too small, it has been found that the performance of the okra product in deflocculating paper or in contributing ropiness to liquids drops off materially. This may be due to one or two reasons. First, if the particles are too fine, the heat generated in grinding tends to degrade them much more rapidly than the more coarse particles. Second, it may be that grinding too fine causes a molecular degradation of the okra product.

In determining the performance of an okra product it has been found that it may be rated according to the ability of the product to impart ropiness to water. This is measured by making up a predetermined concentration of the okra product in water and then determining the volume of the liquid which will spill over from a container tipped to the point just where liquid begins to flow. Since a good or stable okra product will give the liquid the character of uncooked egg whites, it will be seen that the greater the degree of ropiness imparted to the liquid, the greater will be the volume spilled over.

The optimum particle size of the finely ground okra product may be defined as that which will pass through a standard U.S. 200-mesh screen and will be retained on a 325-mesh screen. This means that the particle size is somewhat over 44 microns, but less than about 75 microns, the sieve opening of a 200-mesh screen. Thus a preferable size range for the major portion, i.e., 60% by weight or greater, is from about 45 to 75 microns.

Using the ropiness test and assuming that okra products ground to the preferred range stated above to have a relative value of 100, it can be shown that material ground so fine as to pass a 325-mesh screen had a relative value of 67. If particles are permitted to remain coarser than the range specified, the ropiness value falls off also, probably due to the large particle size and hence to a lessening in the ability of the okra product to swell rapidly in the water into which it was mixed. The material decrease in performance of the fine material indicates that grinding to particle sizes below about 45 microns is to be avoided if a product is obtained which will be stable over extended periods and which will give a good performance as an additive to impart ropiness to liquids or as a deflocculant in paper making.

The temperature of grinding is also very important in producing a non-degraded product. The temperature appears to be a factor separate from particle size, but it has been noted that degradation is more marked when excessive grinding temperatures have been used to produce material finer than about 40 to 45 microns. However, excessive grinding temperatures have been found to materially degrade the coarser size particles also.

Figure 3:
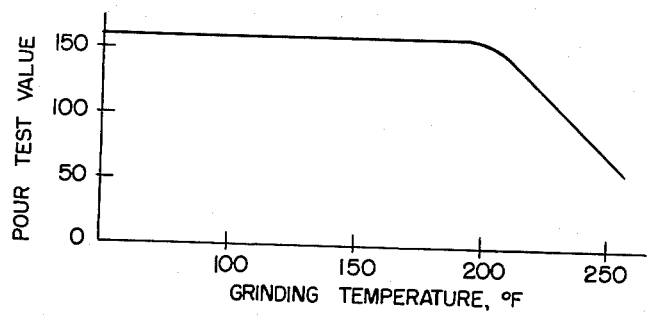
FIG. 3 illustrates the effect of grinding temperature upon the properties of the product of this invention.

The effect of grinding temperatures is clearly shown in FIG. 3 wherein performance (in terms of pour test values) is plotted against temperature of grinding. In obtaining these data, the grinding was accomplished by means of a hammermill and a thermocouple was placed at the bottom of the plate of the mill at the point where air and the finally ground product left the mill. It is believed that this thermocouple position gave a true indication of the temperature of grinding. From the plat of FIG. 3 it will be seen that grinding temperature should not exceed about 210° F., if material degradation in the final product is not to be tolerated.

Other factors contribute to the final production of a novel material from okra pods by the process of this invention. These factors include the handling of the pods after picking and the maturity of the pods.

In handling the pods it is essential that they be kept as cool as possible after picking. Moreover, the pods should be used directly after picking and not stored for any length of time.

If, however, it is desired to keep the fresh pods for a time after they have been picked, it is possible to preserve them by freezing. Such freezing should be done without the blanching treatment which is normal procedure in freezing vegetables. The heat required in the blanching step materially degrades the okra so that the final product is far less efficient than okra frozen without blanching. Okra product made from pods which were frozen without blanching has been found to be equally effective as the product made from the fresh okra pods.

The maturity of the pod also has a great deal of influence upon the performance of the final okra product in terms of extent of degradation of the product. In this case pod maturity is defined as the days elapsed between the time the pod begins to form and the time at which the pod is picked. Pods which are permitted to mature for from about four to eight days give a final okra product having ropiness values in the order of three times greater than those pods permitted to mature 11 or 12 days. For this reason it is preferred to use okra pods of not greater than eight days' maturity.

The okra product resulting from drying the material after the last extraction step, but before grinding, is an extremely friable, light colored aggregative material, the size of the aggregates varying with the degree of maceration of the original okra pods. This aggregative okra product can be further characterized as being essentially free from active enzymatic systems and from alcohol-soluble materials.

The powder resulting from grinding the aggregative material is a flour-like, light colored material having an apparent density ranging from about 0.1 to 0.5 gm./cc. When grinding is performed to the extent and with the temperature limitations specified the powder is extremely effective in imparting ropiness to aqueous liquids and in deflocculating paper-making fibers of very long lengths.

The undegraded, active character of the okra product is the result of the process of this invention, for by dehydrating the okra pods very rapidly and at relatively low temperatures, the enzymatic action is stopped sufficiently rapidly to prevent degradation, materials on which enzymes live are removed and at the same time the mucilaginous content of the pods is unharmed.

The following examples, which are meant to be illustrative and not limiting, show the application of the process of this invention to okra pods and to hibiscus roots.

*Example I*

In a pilot plant such as represented by FIG. 1, emerald green okra pods of 4 to 6 days' maturity were washed and fed into a meat grinder at a rate of about 215 pounds per hour. The overall feed rate of isopropyl alcohol (commercial grade), as regulated by meter 52, was maintained at about 300 pounds per hour. When the process had reached essentially continuous operation the alcohol concentration in the slurry tank 18 was about 52% by weight, that in the first extraction vessel 30 was about 79%, and that in the second extraction vessel 38 was about 86%. The average time that any one quantity of okra pods required to be processed was about 20 to 30 minutes from the time it was introduced in the grinder 14 until it was delivered to the station 46.

The total solids content of the material leaving each of the screw presses, but before entering the corresponding extraction vessel, was determined. The solids content of the material leaving screw press 26 (FIG. 1) was about 21%, that of the material leaving screw press 36 was about 35% while that leaving screw press 44 was 60%.

The dehydrated material as it passed into the receiving station 46 was a damp, crumbly material containing about 60% solids by weight. The remaining liquid content was about 55% water. The average hourly output of the alcohol damp material was between about 31 and 32 pounds, equivalent on a dry product basis to between 18 and 19 pounds.

When the final dry product from this example was ground to an average size of between 45 and 75 microns a sample was made up into an 0.25% concentration water dispersion. Three hundred cc. of this dispersion was then subjected to the pour test described above. In this pour test 169 cc. of the dispersion spilled over as a ropy agglomerate as compared to about 11 cc. of pure water used as a control. It will be seen that the okra product was very effective in imparting ropiness to water.

*Example II*

To illustrate the effectiveness of the process of this invention in extracting the mucilage-producing material from other mucilage-bearing plants, the roots of the giant sun glory hibiscus (known to contain mucilaginous material) were treated to extract the mucilage-producing content from them.

Some 855 gm. of dry hibiscus roots were macerated by passing them through a meat grinder. These contained only 44% water by weight so 2905 gm. water was added to give a composition which was 90% water by weight to simulate fresh green roots. This mixture was permitted to stand over night. It developed into a very ropy mass. This was divided into two portions of 1737 gm. each. There had been some loss in weight due to evaporation and spillage.

The first portion was treated according to the process of this invention. This portion was added to 1740 gm. of 99% isopropyl alcohol, the mixture stirred and the solids were then put into a juice press and the compressed mass introduced while still compressed into another 1740 gm. portion of isopropyl alcohol. This was permitted to stand for about 15 minutes and the compression step was repeated in the same way as the first compression step. The product removed from the third batch of extraction liquid was drained on a cheese cloth.

The second portion of macerated hibiscus roots was likewise added to 1740 gm. of 99% isopropyl alcohol, the mixture stirred and the solids were put through the juice press and then allowed to expand in air. After expansion was complete, the mass was introduced into another 1740 gm. batch of isopropyl alcohol and permitted to stand for about 15 minutes. This also was repeated, allowing the compressed material to expand before introduction into the third extraction liquid. After a final pass through the juice press, the material was drained on a cheese cloth to the same extent as that resulting from the first portion.

The final material from the first portion of hibiscus roots processed in accordance with this invention weighed 272.9 gm. and contained 31.1% by weight of volatiles, of which 8% was water. The final material from the second portion weighed 334.1 gm. and contained 43.8% by weight of volatiles, of which 17.8% was water.

The marked increase in the degree of dehydration achieved by the process of this invention is seen in the fact that the overall water content of the material from the first portion amounted to only about 2.5% while that of the material from the second portion was 7.8%, i.e., three times as much.

Thus the process of this invention provides a way of rapidly and effectively removing water from the mucilage-bearing portion of a plant to give a stable, dry, mucilage-producing material having many interesting properties and applications.

We claim:

1. A dry product comprising friable aggregates, the aggregates consisting of dry, potentially mucilaginous material of mucilage-bearing plants bound in random fashion to alcohol-insoluble cellulosic material contained therein to form a free-flowing divided material, said material being reducible to an active, stable flour-like powder having an apparent density of between about 0.1 and about 0.5 gm./cc. when ground at temperatures below about 210° F. to a particle size ranging between about 45 and 75 microns, the product being further characterized by its ability to quickly disperse in aqueous liquids by simple stirring to impart a stable, ropy-like character to said liquid.

2. A dry product comprising friable aggregates, the aggregates consisting of dry, potentially mucilaginous material of the okra pod bound in random fashion to alcohol-insoluble cellulosic material contained therein to form a free-flowing divided material, said material being reducible to an active, stable flour-like powder having an apparent density of between about 0.1 and about 0.5 gm./cc. when ground at temperatures below about 210° F. to a particle size ranging between about 45 and 75 microns, the product being further characterized by its ability to quickly disperse in aqueous liquids by simple stirring to impart a stable, ropy-like character to said liquid.

3. A dry product comprising friable aggregates, the aggregates consisting of dry, potentially mucilaginous material of the okra pod bound in random fashion to alcohol-insoluble cellulosic material contained therein to form a free-flowing divided material, said material being reducible to an active, stable flour-like powder having an apparent density of between about 0.1 and about 0.5 gm./cc. when ground at temperatures below about 210° F. to a particle size ranging between about 45 and 75 microns, the product being further characterized by being essentially free from any effective enzymatic systems and from alcohol-soluble materials and by its ability to quickly disperse in aqueous liquids by simple stirring to impart a stable, ropy-like character to said liquid.

References Cited in the file of this patent

UNITED STATES PATENTS

| | | |
|---|---|---|
| 2,137,170 | Levey | Nov. 15, 1938 |
| 2,708,174 | Stavely | May 10, 1955 |
| 2,731,731 | Hink | Jan. 24, 1956 |
| 2,810,207 | McWhorter | Oct. 22, 1957 |

OTHER REFERENCES

Food Industrier, April 1944, pages 67–71.